United States Patent

O'Fearna

[11] Patent Number: 5,182,928
[45] Date of Patent: Feb. 2, 1993

[54] HOSE BIBB CLOSURE

[76] Inventor: Patrick J. O'Fearna, 1453 S. Westgate, Apt. 4, Los Angeles, Calif. 90025

[21] Appl. No.: 749,124

[22] Filed: Aug. 23, 1991

[51] Int. Cl.$^5$ ............................................. F16B 41/00
[52] U.S. Cl. ....................................... 70/232; 138/89; 285/80; 285/901
[58] Field of Search ............... 285/80, 901, 8; 138/89, 138/96 J; 70/232, 180; 137/383, 384

[56] References Cited

U.S. PATENT DOCUMENTS

| | | | |
|---|---|---|---|
| 2,048,424 | 7/1936 | Caldwell | 70/232 |
| 3,678,717 | 7/1972 | Eaton | 70/232 |
| 4,803,858 | 2/1989 | Porker | 70/232 X |
| 4,826,215 | 5/1989 | Sullivan | 285/80 |
| 4,848,458 | 7/1989 | Holdsworth et al. | 285/901 |
| 5,066,049 | 11/1991 | Staples | 285/80 |

Primary Examiner—Dave W. Arola
Attorney, Agent, or Firm—Timothy T. Tyson

[57] ABSTRACT

A closure (20) for an outdoor hose bibb (24) is provided. A cap (30) engages the hose bibb threaded spout (46). A lip (52) on a collar (32) passes through a slot (50) in the cap and abuts the narrowed spout (54) above the spout threads. The cap and collar are coupled by a hook (60) engaging a handle (62) and by holes (84,88) in tabs (66,64) extending from the cup and the collar. The shackle (70) of a lock (34) passes through the tab holes.

6 Claims, 2 Drawing Sheets

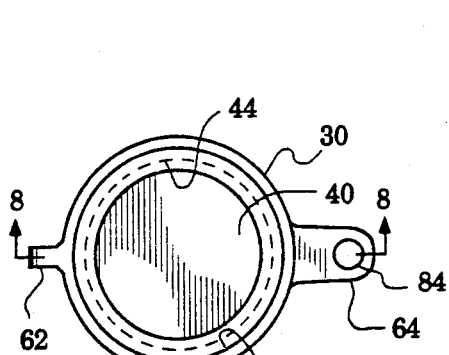
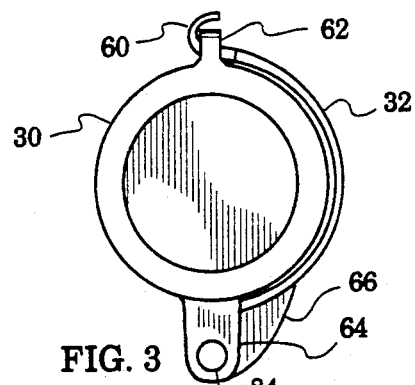
FIG. 4  FIG. 3
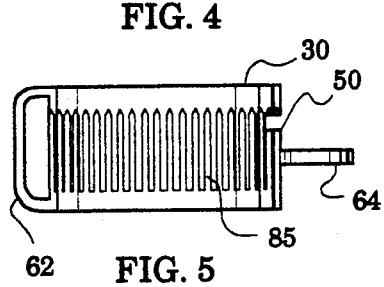 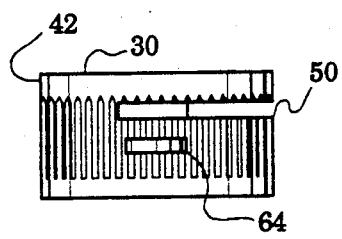 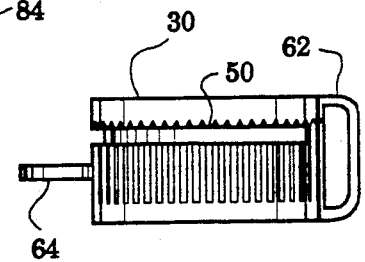
FIG. 5  FIG. 6  FIG. 7
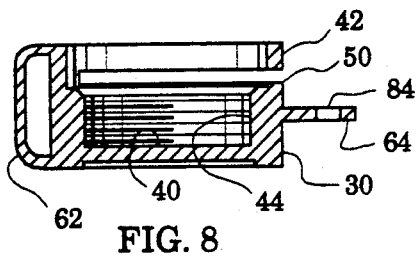
FIG. 8
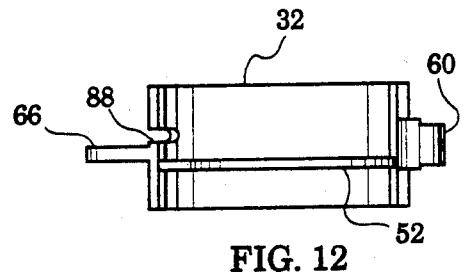
FIG. 12
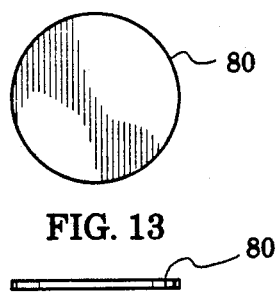
FIG. 13
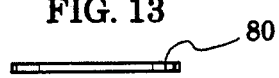
FIG. 14
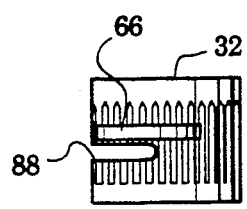
FIG. 11
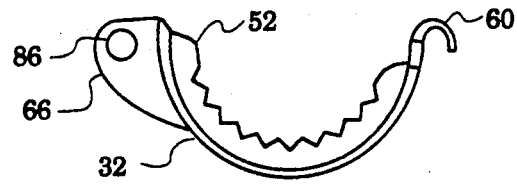
FIG. 9  FIG. 10

HOSE BIBB CLOSURE

TECHNICAL FIELD

The present invention pertains to water use security devices and more particularly, to security devices for hose bibbs.

BACKGROUND ART

The water use security art is replete with devices for securing faucets and bibcocks against unauthorized use. These devices generally do not provide simple inexpensive closure of an outdoor hose bibb.

Examples of the art are found in U.S. Pat. Nos. 852,303, 1,038,308, 1,040,039, 1,379,827, 1,482,008, 1,794,581, 2,063,442, 2,161,626, 2,647,532, 2,748,794, 2,838,064, 3,156,256, 3,532,111, 3,662,320, 4,397,332, 4,458,923, 4,516,414, and 4,826,215.

DISCLOSURE OF INVENTION

The present invention is directed to apparatus for closure of a hose bibb to prevent unauthorized use.

Apparatus in accordance with the invention are characterized by a threaded cap to seal the hose bibb spout and a collar having a lip to extend through a slot in the cap to abut the narrowed spout above the spout threads. The lip thus denies unauthorized removal of the cap.

In a preferred embodiment the collar is coupled to the cap by a hook engaging a handle and by the alignment of holes in tabs extending from both the cap and the collar. In the preferred embodiment the coupling is secured by passing the shackle of a lock through the tab holes.

The novel features of the invention are set forth with particularity in the appended claims. The invention will be best understood from the following description when read in conjunction with the accompanying drawings.

BRIEF DESCRIPTION OF DRAWINGS

FIG. 3 is a view along the plane 3—3 of FIG. 1;

FIG. 4 is a plan view of the cap of the closure of FIG. 1;

FIG. 5 is a left elevation view of the cap of FIG. 4;

FIG. 6 is a front elevation view of the cap of FIG. 4;

FIG. 7 is a right elevation view of the cap of FIG. 4;

FIG. 8 is a sectional view along the plane 8—8 of FIG. 4;

FIG. 9 is a left elevation view of the collar of the closure of FIG. 1;

FIG. 10 is a front elevation view of the collar of FIG. 9;

FIG. 11 is a plan view of the collar of FIG. 9;

FIG. 12 is a rear elevation view of the collar of FIG. 9;

FIG. 13 is a plan view of the gasket of the closure of FIG. 1; and

FIG. 14 is elevation view of the gasket of FIG. 13.

MODE FOR CARRYING OUT THE INVENTION

Figure 1:
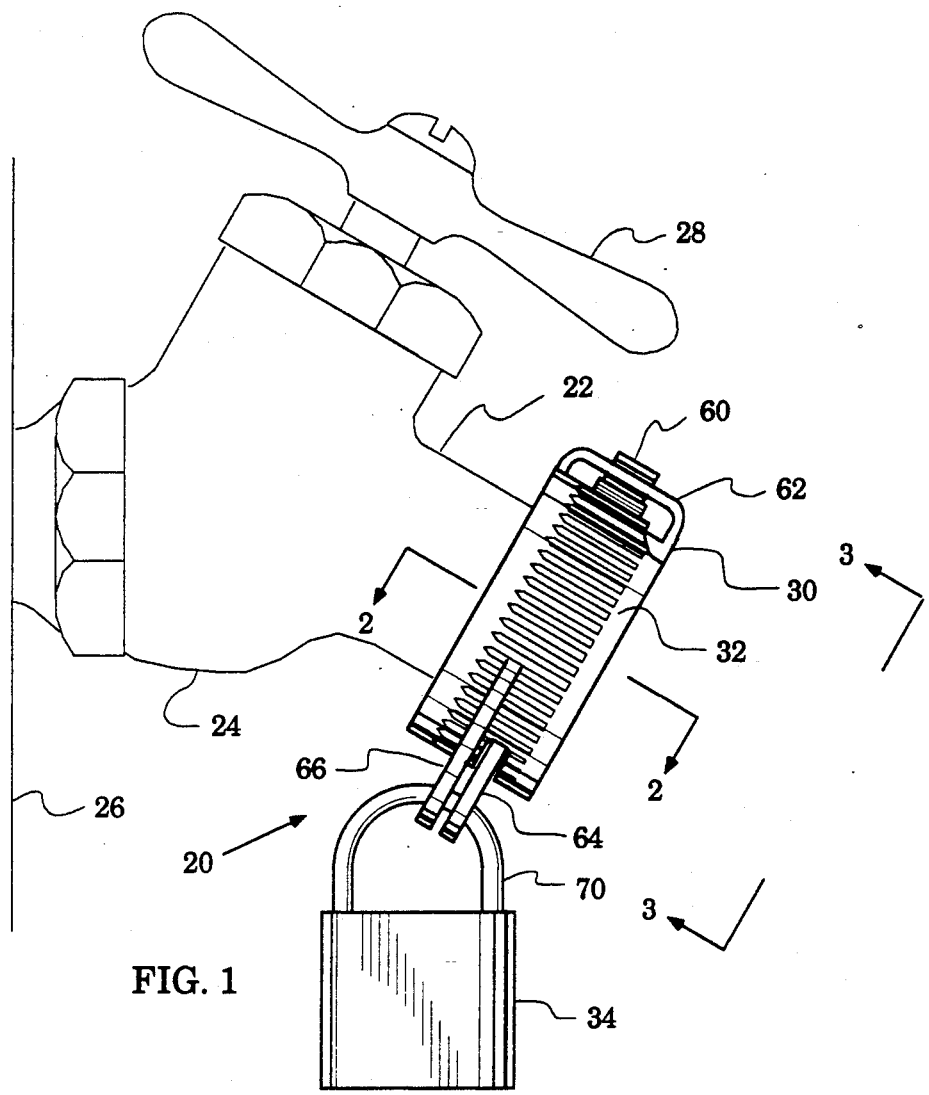
FIG. 1 is an elevation view of a hose bibb closure, in accordance with the present invention, installed on a hose bibb.

A hose bibb closure embodiment 20, in accordance with the present invention, is illustrated in FIG. 1 installed on the spout 22 of a hose bibb 24 extending from a wall 26. The closure 20 prevents unauthorized use of the hose bibb 24 by denying access to the threaded portion of the spout 22 and by also sealing the end of the spout 22. Therefore, a hose cannot be attached to the hose bibb 24 and, in addition, if the hose bibb handle 28 is turned on water will not issue therefrom.

Figures 2A, 2B:
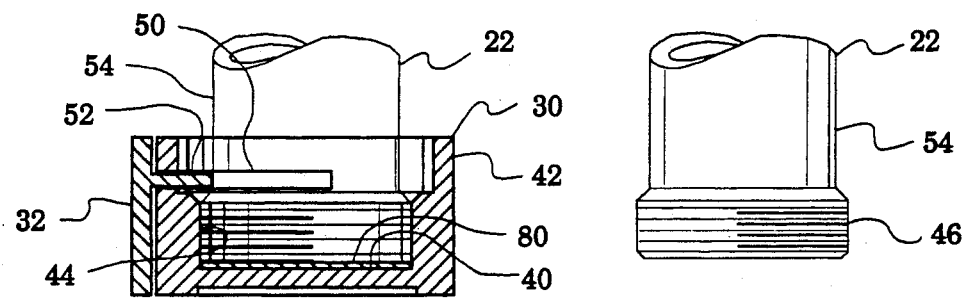
FIG. 2A is a view along the plane 2—2 of FIG. 1.
FIG. 2B is a view along the plane 2—2 of FIG. 1 without the closure.

FIG. 2A is a sectional view along the plane 2—2 of FIG. 1 with the hose bibb spout 22 shown in full. FIG. 2B is a view similar to FIG. 2A without the closure 20. In particular, FIGS. 1, 2A and 2B shown that the closure 20 has a cap 30, a collar 32 and a lock 34 (a portion of the collar 32 is broken away to reveal the cap 30 below). The cap 30 has a bottom 40 with a skirt 42 therearound. The skirt 42 has internal threads 44 which engage the threaded end 46 of the bibb spout 22. The skirt 42 also has a slot 50. The collar 32 has an inwardly extending lip 52 which protrudes through the slot 50 to abut the narrowed portion 54 of the spout 22 above the spout threads 46.

The collar 32 is coupled to the cap 30 by a hook 60 of the collar 32 engaging a handle 62 of the cap 30 and by a tab 64 of the cap 30 having an adjacent tab 66 of the collar 32. The shackle 70 of the lock 34 passes through holes in the tabs 64, 66 thus locking the coupling of the collar 32 to the cap 30. If the closure 20 is turned, in an attempt to remove it from the threaded spout end 46 of the hose bibb 24, the lip 52 is brought to bear upon the threaded end 46 which it cannot clear. Thus the closure 20 is secured to the hose bibb 24.

The coupling of the cap 30 and the collar 32 is also shown in FIG. 3 which is a view along the plane 3—3 of FIG. 1. FIG. 3 further illustrates the engagement of the handle 62 by the hook 60 and the alignment of the tabs 64, 66.

The parts of the closure 20 will now be considered in detail. FIGS. 4, 5, 6 and 7 are, respectively, a left elevation view, a front elevation view, a right elevation view and a plan view of the cap 30. FIG. 8 is a sectional view along the plane 8—8 of FIG. 4. FIGS. 9, 10, 11 and 12 are, respectively, a left elevation view, a front elevation view, a plan view and a rear elevation view of the collar 32. FIG. 13 is a plan view of a gasket 80 while FIG. 14 is a plan view of the gasket 80.

As seen in the aforementioned views the cap 30 has a handle 62 and a tab 64 extending from opposite sides of the skirt 42. The tab 64 has a hole 84 therethrough. The slot 50 extends along most of one side of the skirt 42. The skirt 42 has internal threads 44 above the bottom 40. The skirt 42 of the cap 30 has a raised pattern 85 to facilitate gripping it with a hand.

The collar 32 is shaped to conform to the cap 30 and is has the hook 60 and the tab 66 extending from opposite ends thereof. The lip 52 extends inwardly from the collar 32. The tab 66 has a hole 86 which, in the assembled closure 20 of FIG. 1, substantially aligns with the hole 84 in the cap tab 64 to receive the shackle 70 of the lock 34. Beneath the tab 66, the collar 32 has a notch 88 which, as illustrated in FIG. 1, receives the cap tab 64. Similar to the cap 30, the collar 32 has a raised pattern 89.

The gasket 80 illustrated in FIGS. 12, 13 is of a resilient material (e.g. rubber) to effect a seal between the cap bottom 40 and the spout threaded end 46.

The closure 20 is installed (best seen in FIGS. 1, 2A and 3) by threading the cap 30 onto the threaded spout end 46, engaging the cap handle 62 with the collar hook 60 and swinging the collar 32 to abut the cap 30. This movement causes the lip 52 to protrude through the slot 50 and abut the narrowed spout 54.

From the foregoing it should now be recognized that a hose bibb closure has been disclosed herein to seal a hose bibb against unauthorized use. The closure utilizes a cap and a collar both configured to extend a lip of the collar through a slot of the cap to abut the hose bibb narrowed spout which prevents removal of the closure. An apparatus in accordance with the present invention is simple and can be manufactured inexpensively of various materials (e.g. brass, steel, plastics). Such an apparatus is easy to use and prevents water wastage and the bills resulting therefrom.

Although the present invention has been described with reference to preferred embodiments, numerous modifications and rearrangements can be made with the equivalent result still embraced within the scope of the invention.

What is claimed is:

1. Hose bibb closure, comprising:
   a cap defining a bottom and a skirt therearound, said skirt defining internal threads to rotatably engage the hose bibb spout threads with said bottom abutting the hose bibb spout end, said skirt further defining a slot therein;
   a collar having a lip to protrude inward through said slot and abut the narrowed hose bibb spout above the hose bibb spout threads;
   means for coupling said collar to said cap; and
   lock means for locking said coupling means;
   the hose bibb thereby secured against unauthorized use thereof.

2. Hose bibb closure as defined in claim 1 wherein said coupling means comprises a handle extending from said skirt;
   a skirt tab defining a skirt tab hole therein, said skirt tab extending from said skirt;
   a hook extending from said collar to engage said handle; and
   a collar tab defining a collar tab hole therein, said collar tab extending from said collar;
   said skirt tab hole substantially aligned with said collar tab hole.

3. Hose bibb closure as defined in claim 2 wherein said lock means comprises a lock having a shackle, said shackle passed through said skirt tab hole and said collar tab hole.

4. Hose bibb closure as defined in claim 1 further comprising a resilient washer adjoining said bottom to facilitate sealing thereof with the hose bibb spout end.

5. Hose bibb closure as defined in claim 1 wherein said collar is configured to conform with said cap.

6. A method of securing a hose bibb, comprising the steps of:
   threading a threaded cup onto the hose bibb spout;
   engaging the hook of a collar with a ring on said cup;
   leading a lip on said collar through a slot in said cup;
   abutting the narrowed hose bibb spout above the spout threads with said lip;
   aligning a hole in a tab on said collar with a hole in a tab on said cup; and
   securing the shackle of a lock through said collar tab hole and said cup tab hole.

* * * * *